United States Patent
Merwin et al.

[11] Patent Number: 5,909,365
[45] Date of Patent: Jun. 1, 1999

[54] LEAKAGE CURRENT POWER SUPPLY

[75] Inventors: Jeffrey D. Merwin, Buffalo Grove; Dennis L. Stephens, Niles, both of Ill.

[73] Assignee: Motorola Inc., Schaumburg, Ill.

[21] Appl. No.: 08/885,448

[22] Filed: Jun. 30, 1997

[51] Int. Cl.⁶ .......................................... H02M 7/06
[52] U.S. Cl. ................................ 363/89; 363/126
[58] Field of Search ........................ 363/89, 125, 126

[56] References Cited

U.S. PATENT DOCUMENTS

| | | | |
|---|---|---|---|
| 3,506,905 | 4/1970 | Thomas | 363/89 |
| 4,063,307 | 12/1977 | Stephens | 363/21 |
| 4,126,830 | 11/1978 | Schade, Jr. | 330/277 |
| 4,127,895 | 11/1978 | Krueger | 363/89 |
| 4,158,863 | 6/1979 | Naylor | 361/56 |
| 4,183,082 | 1/1980 | Ishii | 363/89 |
| 4,385,336 | 5/1983 | Takeshita et al. | 361/42 |
| 4,428,018 | 1/1984 | Hahn | 361/42 |
| 4,430,683 | 2/1984 | Kawai et al. | 361/42 |
| 4,478,468 | 10/1984 | Schoen et al. | 363/89 |
| 4,481,564 | 11/1984 | Balaban | 363/21 |
| 4,609,982 | 9/1986 | Gohda | 363/89 |
| 4,641,233 | 2/1987 | Roy | 363/89 |
| 4,685,022 | 8/1987 | Nichols, III et al. | 361/44 |
| 4,874,962 | 10/1989 | Hermans | 307/178 |
| 4,992,723 | 2/1991 | Zylstra et al. | 323/284 |
| 5,134,355 | 7/1992 | Hastings | 363/89 |
| 5,161,240 | 11/1992 | Johnson | 361/42 |
| 5,175,477 | 12/1992 | Grissom | 315/291 |
| 5,191,318 | 3/1993 | Glennon | 340/635 |
| 5,192,896 | 3/1993 | Qin | 315/224 |
| 5,307,257 | 4/1994 | Fukushima | 363/89 |
| 5,382,882 | 1/1995 | Nerone | 315/307 |
| 5,408,162 | 4/1995 | Williams | 315/224 |
| 5,428,494 | 6/1995 | Ahuja | 361/62 |
| 5,451,845 | 9/1995 | Ribarich | 315/225 |
| 5,453,665 | 9/1995 | Konopka | 315/219 |
| 5,455,491 | 10/1995 | Hajagos et al. | 315/291 |
| 5,481,163 | 1/1996 | Nakamura et al. | 315/308 |
| 5,614,812 | 3/1997 | Wagoner | 363/89 |
| 5,703,764 | 12/1997 | Hermann et al. | 363/89 |
| 5,757,635 | 5/1998 | Seong | 363/89 |

*Primary Examiner*—Jeffrey Sterrett
*Attorney, Agent, or Firm*—Kenneth D. Labudda; Gary J. Cunningham

[57] ABSTRACT

An electronic power supply (100) receives power from an AC source (10) and supplies power to a load (20) that is referenced to earth ground (30). Power supply (100) comprises a power converter (200) and a voltage regulator (400). Power converter (200) draws a ground leakage current from AC source (10) and is capable of providing a steady-state output current having an average value that is greater than that of the ground leakage current. Voltage regulator (400) limits the output voltage of the power converter (200) to a predetermined level. In a preferred embodiments power converter (200) is implemented as a self-oscillating converters and power supply (100) draws a ground leakage current that is sufficiently small to meet regulatory limits and to avoid tripping of conventional ground-fault interrupters.

9 Claims, 3 Drawing Sheets

LEAKAGE CURRENT POWER SUPPLY

FIELD OF THE INVENTION

The present invention relates to the general subject of electronic power supplies and, in particular, to a leakage current power supply.

BACKGROUND OF THE INVENTION

Energy monitoring and control systems are widely used in order to achieve sophisticated control of the loads in building electrical systems. The loads typically consist of a vast array of devices and sub-systems, the most prominent of which from an energy consumption standpoint are the components of the heating, cooling, and lighting systems. With the recent emphasis upon energy conservation and power utility savings, and the desire for increased effectiveness and reduced time in finding and correcting load problems, energy monitoring and control systems are rapidly becoming a required element of the electrical systems in large facilities such as factories, offices, schools, hospitals, and public buildings. Further, as such systems become less costly and easier to install, and/or energy conservation becomes increasingly important, their presence will become widespread in other applications such as private homes.

An important type of energy control system employs a control station that is coupled between the hot wire of the AC source and earth ground. A significant advantage of this type of energy control system is its relative ease of installation, since it requires no connection to the neutral wire of the AC source, which is often inaccessible in the wall-mount switchboxes of most buildings. Like most electrical circuits, the control station requires a power source to supply its operating power needs. However, as a load that is referenced to earth ground, the control station requires a power source that is also referenced to earth ground and that, like the control station, requires no connection to the neutral wire of the AC source.

Among existing approaches for providing a ground referenced power source without accessing the neutral wire, the most straightforward approach is to simply use a battery. Unfortunately, this has the disadvantage of considerable long-term monetary expense, as well as the major inconvenience associated with periodic failure and replacement of batteries. It is therefore highly desirable that the power source obtain its energy from the AC source.

One existing method is to use a current transformer connected in series with the hot line of the AC source. Another method, commonly found in dimmer switches for incandescent lights, employs an electronic switch such as a triac and uses the non-conducting portion at the start of each AC line cycle to obtain power for the control electronics. In addition to other shortcomings, both approaches have the serious disadvantage of being impractical for use in branch circuits that carry high levels of current, and are therefore ill-submitted for use in many applications.

Several types of off-the-shelf power converters, coupled between the hot wire of the AC source and earth ground, are capable of providing the power needed to operate a control station or other ground referenced load, but cannot do so without drawing an excessive amount of "ground leakage" current. The amount of leakage current that may be permissibly drawn from, or returned to, each ground is limited by at least two constraints. First regulatory and safety standards (such as those set forth by Underwriters Laboratories) typically limit the root-mean-square (RMS) value of the ground leakage current to less than about 5 milliamperes. Secondly ground-fault interrupters (GFIs), which are widely employed in residential applications, automatically "trip" and disconnect the AC source from the branch circuit if the RMS current flowing to earth ground attempts to exceed a value that is on the order of more than a few milliamperes.

It is thus apparent that a need exists for a power supply circuit that provides a reliable, cost-effective, and easily installed source of power for devices connected between the AC line and earth ground, and that draws low enough a ground leakage current to satisfy regulatory standards and to avoid nuisance tripping of ground-fault interrupters. Such a power supply would represent a significant advance over the prior art.

DETAILED DESCRIPTION OF THE PREFERRED EMBODIMENTS

Figure 1:
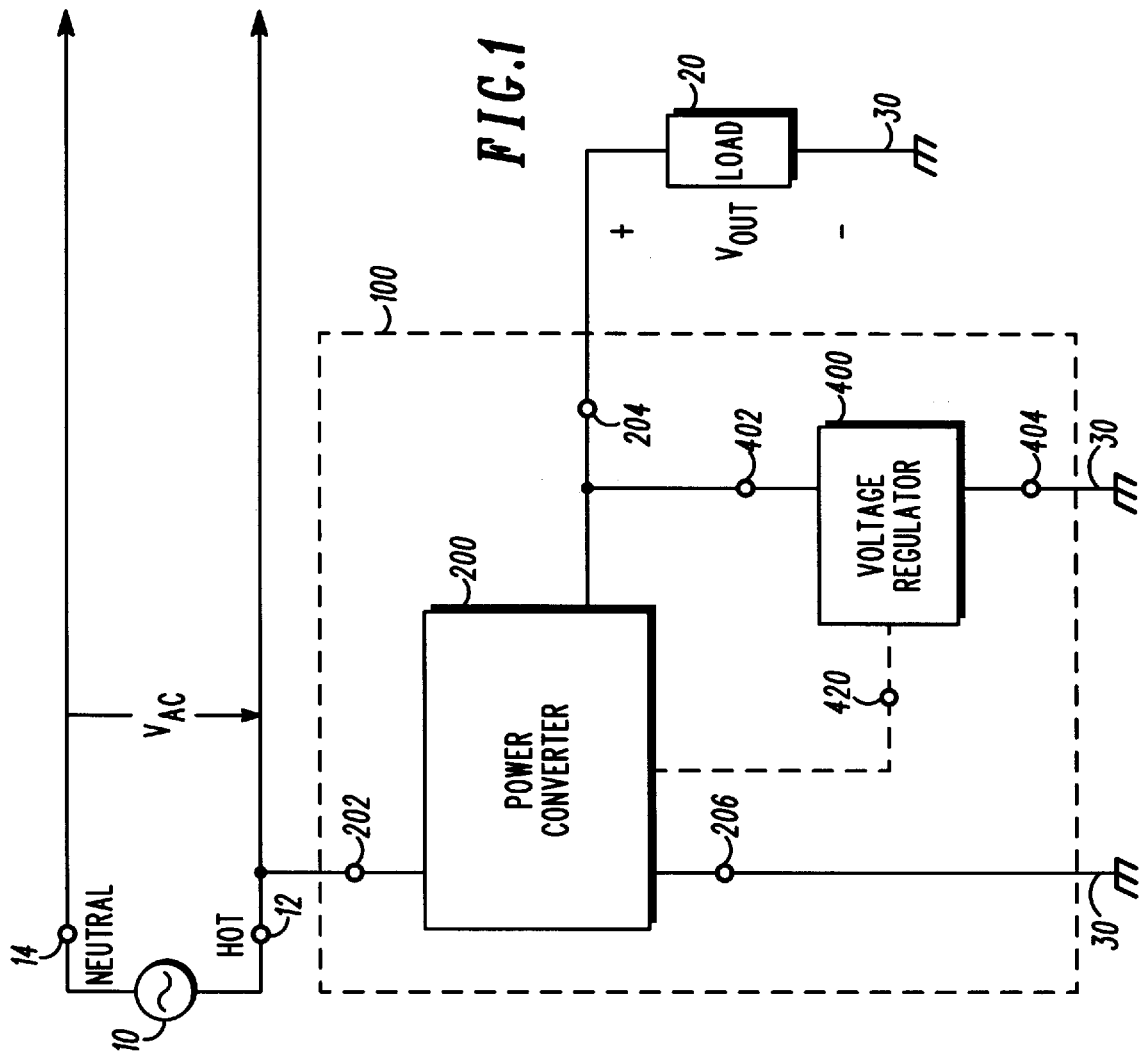
FIG. 1 is a block diagram of an electronic power supply for powering a load that is referenced to earth ground, in accordance with the present invention.

FIG. 1 describes an electronic power supply 100 for receiving power from an alternating current (AC) source 10 and for supplying power to a load 20 that is referenced to earth ground 30. Power supply 100 comprises a power converter 200 and a voltage regulator 400. Power converter 200 includes an input terminal 202 coupleable to AC source 10, an output terminal 204 coupleable to load 20, and a ground terminal 206 coupleable to earth ground 30. During operation, power converter 200 receives a ground leakage current at input terminal 202, and provides an output voltage, $V_{OUT}$, between output terminal 204 and earth ground 30. Power converter 200 is further operable, when load 20 is appropriately sized, to supply an output current having a steady-state average value that is greater than that of the ground leakage current. Voltage regulator 400 includes an input connection 402 coupled to the output terminal 204 of power converter 200, and a ground connection 404 coupleable to earth ground 30. In at least one embodiment, voltage regulator 400 also includes a regulation output 420 that is coupled to power converter 200. Voltage regulator 400 is operable to limit the output voltage, $V_{OUT}$, to a predetermined level.

Power supply 100 uses ground leakage current from AC source 10 to provide a regulated source of power for one or more loads that are referenced to earth ground. Since it does not require any connections to the commonly inaccessible neutral wire 14 of AC source 10, power supply 100 is also relatively easy to install in existing AC branch circuits.

In a preferred embodiment of power supply 100, the ground leakage current drawn by power supply 100 is sufficiently low to avoid tripping of a conventional ground-fault interrupter. In order to meet regulatory and safety requirements, it is preferred that power supply 100 be designed so that the steady-state root-mean-square (RMS) value of the ground leakage current is less than about 5 milliamperes. At the same time, in order to serve as a useful power source for ground referenced loads such as power line transmitters and other components of building control systems, it is preferred that power supply 100 be capable of supplying an output current having a steady-state RMS value that is greater than about 5 milliamperes, as well as an output voltage having an average value that is on the order of less than about 10 volts. For many types of microprocessors and other low power CMOS-based circuits, the standard supply voltage requirement is about 3.3 volts.

Figure 2:
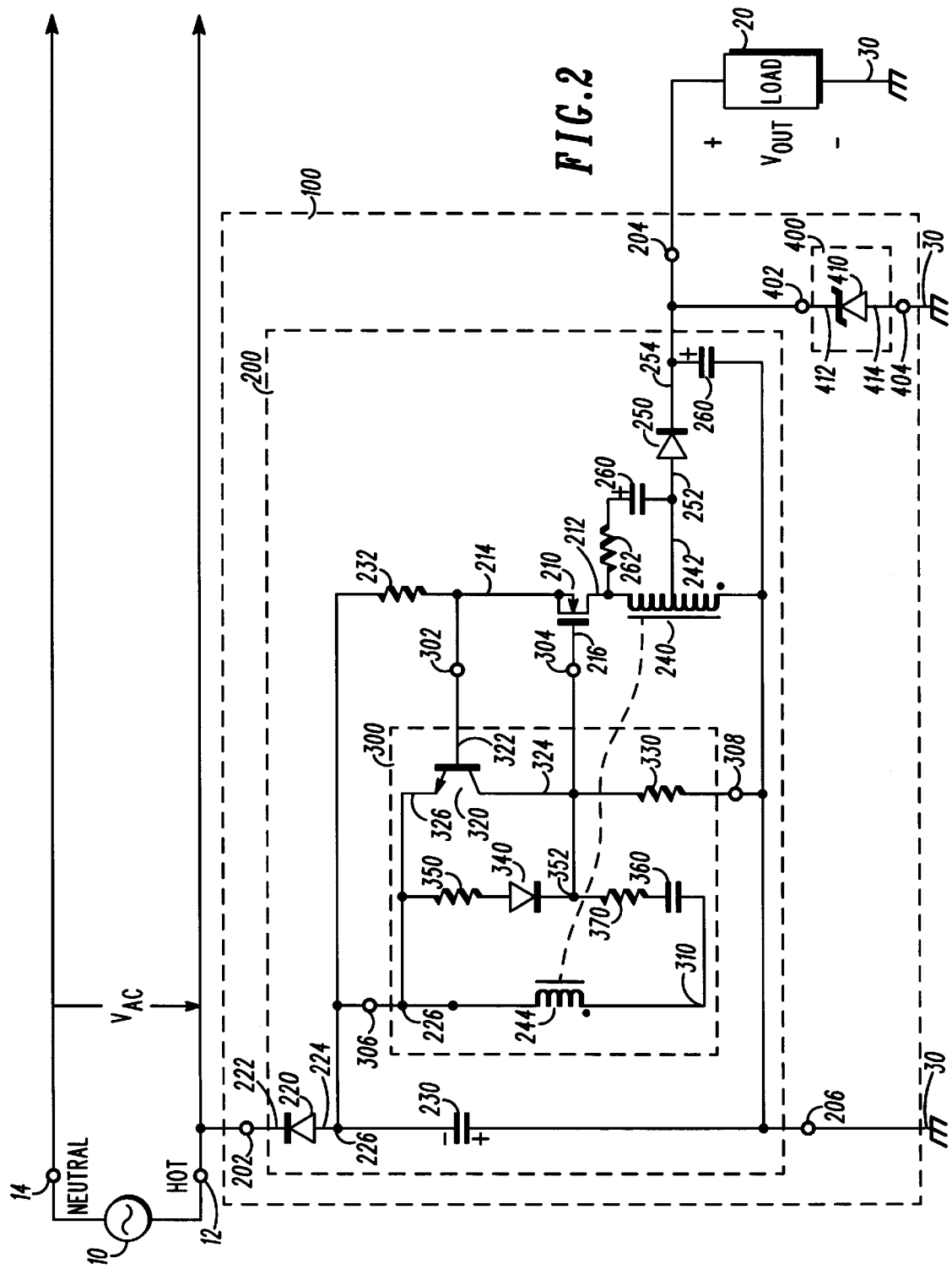
FIG. 2 is an electrical schematic of the power supply of FIG. 1, in accordance with a first preferred embodiment of the present invention.

Referring now to FIG. 2, in a first preferred embodiment of power supply 100, power converter 200 further comprises a converter switch 210, a first rectifier 220, a filtering capacitor 230, a current sensing resistor 232, an inductor having a primary winding 240 and a tap connection 242, a second rectifier 250, an energy storage capacitor 260, and a control circuit 300 for turning converter switch 210 on and off. Converter switch 210, which is preferably implemented using an N-channel field-effect transistor (FET), has a drain lead 212, a source lead 214, and a gate lead 216. First rectifier 220 has a cathode 222 coupled to input terminal 202, and an anode 224 coupled to a first node 226. Filtering capacitor 230 is coupled between first node 226 and ground terminal 206. Current sensing resistor 232 is coupled between first node 226 and the source lead 214 of converter switch 210. Inductor primary winding 240 is coupled between ground terminal 206 and the drain lead 212 of converter switch 210. Second rectifier 250 has an anode 252 coupled to the tap 242 of primary winding 240, and a cathode 254 coupled to output terminal 204. Control circuit 300 includes a current sense input 302 coupled to the source lead 214 of converter switch 210, a drive output 304 coupled to the gate lead 216 of converter switch 210, a reference terminal 306 coupled to first node 226, and a ground connection 308 coupled to ground terminal 206.

In preferred embodiment, the inductor of power converter 200 further includes a secondary winding 244 that serves as part of control circuit 300 and that is coupled between reference terminal 305 and a second node 310. "Secondary winding 244 is magnetically coupled to primary winding 240." Control circuit 300 further comprises a turn-off switch 320, a startup resistor 330, a first series combination of a level-shifting rectifier 340 and a first-current limiting resistor 350, and a second series combination of a level-shifting capacitor 360 and a second current-limiting resistor 370. Turn-off switch 320, which is preferably implemented using an NPN-type bipolar junction transistor (BJT), has a base lead 322 coupled to current sense input 302, an emitter lead 326 coupled to reference terminal 306, and a collector lead 324 coupled to drive output 304. Startup resistor 330 is coupled between ground connection 308 and drive output 304. The series combination of level-shifting rectifier 340 and first current-limiting resistor 350 is coupled between reference terminal 306 and a third node 352, wherein level-shifting rectifier 340 is oriented as shown to allow a positive current to flow from reference terminal 306 to third node 352. Third node 352 is also coupled to drive output 304. Finally, the series combination of level-shifting capacitor 360 and second current-limiting resistor 370 is coupled between second node 310 and third node 352.

The detailed operation of power converter 200, and control circuit 300 in particular, is now explained with reference to FIG. 2 as follows. Following initial application of AC power to power supply 100, and due to the orientation of rectifier 220, current flows up from earth ground 30, into ground terminal 206, through capacitor 230 and diode 220, and out of input terminal 202 during at least a portion of each negative half cycle of the AC line voltage, $V_{AC}$. Capacitor 230, which was initially uncharged prior to application of AC power, begins to charge up and soon develops a voltage (note polarity) that reaches a value approximately equal to the peak value of $V_{AC}$.

In order to more clearly understand the operation of power converter 200, it is helpful to view first node 226 as the circuit ground or datum node for power converter 200. As a result of the voltage across capacitor 230, a positive current flows up into ground connection 308 of control circuit 300 and through startup resistor 330. This current charges up both the internal gate-to-source capacitance of FET 210, as well as capacitor 360, and thus causes the voltage at drive output 304 to build up. Once the voltage between drive output 304 and first node 226 reaches about 5 volts or so (which is the typical gate-to-source voltage needed to initiate turn on of a FET), converter switch 210 begins to turn on and to conduct current from drain lead 212 to source lead 214.

With FET 210 in the initial stages of turning on, current begins to flow up through primary winding 240, FET 210, and current sense resistor 232. Because of the inductance of primary winding 240, the current through the winding increases in an approximately linear manner. During this times the voltage across primary winding 240 has a positive polarity when measured from ground terminal 206 (+) to drain lead 212 (–). Correspondingly, secondary winding 244 develops a positive voltage from second node 310 (+) to reference terminal 306 (–). The voltage across secondary-winding 244 causes the voltage at drive output 304 to rise to, say, +15 volts, which reinforces and completes the turn-on of FET 210. As long as the voltage across secondary winding 244 maintains a positive polarity, diode 340 remains reverse-biased and is therefore non-conductive.

As the inductor current continues to increase, the voltage across resistor 232 also continues to increase. Once the inductor current reaches a predetermined value, the voltage at current sense input 302 becomes sufficient (i.e., 0.6 volts or so) to activate turn-off switch 320. With turn-off switch 320 on, drive output 304 is effectively coupled to first node 226 via reference terminal 306. Thus deprived of voltage at gate lead 21, FET 210 begins to turn off. Due to the resulting decrease in the drain-to-source current of FET 210, the voltage across primary winding 240 reverses in polarity, which causes the voltage across secondary winding 244 to likewise reverse in polarity. The resulting voltage across secondary winding 244, in combination with the voltage across level-shifting capacitor 360, causes the voltage at drive output 304 to drop to around –5 volts, which reinforces and completes the turn-off of FET 210. Once turned off, FET 210 and remains off until at least such time as a sufficiently positive voltage (again, with respect to first node 226, which can be thought of as the "ground reference" for power converter 200) is supplied at drive output 304 to initiate turn-on of FET 210.

Following turn off of FET 210, the stored energy in primary winding 240 is transferred into capacitor 260 by way of rectifier 250. Consequently, the current through primary winding 240, which was previously increasing or ramping up when FET 210 was on, begins to decrease in an approximately linear fashion. This causes the voltage across primary winding 240 to reverse in polarity, so that a positive voltage exists between drain lead 212 (+) and ground terminal 206 (–). Consequently, secondary winding 244 develops a positive voltage between reference terminal 306 (+) and second node 310 (–). Therefore, current flows out of secondary winding 244, through resistor 350, diode 340, resistor 370, and into capacitor 360, thus replenishing the stored charge in capacitor 360 in preparation for the next turn on of FET 210.

With FET 210 still off, the current through primary winding 240 continues to decrease, and the transfer of energy from primary winding 240 to capacitor 260 continues, until such time as the current supplied by primary winding 240 falls to approximately zero (or, stated another way, until such time as the energy stored in primary winding 240 is completely transferred to capacitor 260). When the current supplied by primary winding 240 reaches zero, rectifier 250 turns off and energy ceases to be transferred to capacitor 260 from primary winding 240.

Once the energy in primary winding 240 is substantially depleted by transferal to capacitor 260, the voltage across secondary winding 244 collapses due to lack of stored energy. At this point, the voltage at drive output 304 rises from its previously negative value (e.g. −5 volts) to a low positive value (e.g. +5 volts) that is substantially equal to the voltage stored in capacitor 360. As explained previously, this voltage is sufficiently high to initiate turn on of FET 210. Once FET 210 begins to turn on, the current through primary winding 240 once again begins to increase, and the aforementioned events are repeated, with the result that power converter 200 operates as an efficient self-oscillating circuit.

As shown in FIG. 2, power converter 200 optionally includes a snubber circuit comprising a series combination of a snubber capacitor 260 and a snubber resistor 262, the series combination being coupled between the drain lead 212 of converter switch 210 and the tap 242 of primary winding 240. Snubber capacitor 260 and snubber resistor 262 serve to limit the high, and potentially destructive, transient voltage that would otherwise develop across primary winding 240 following turn off of converter switch 210.

Referring again to FIG. 2, voltage regulator 400 may be implemented using a zener diode 410. Zener diode 410 has a cathode 412 coupled to input connection 402, and an anode 414 coupled to ground connection 404. Zener diode 410, which is chosen to have a zener voltage, $V_Z$, equal to the desired output voltage of power supply 100, actively clamps the output voltage at output terminal 204 by turning on and reverse conducting whenever the output voltage attempts to exceed $V_Z$.

Figure 3:
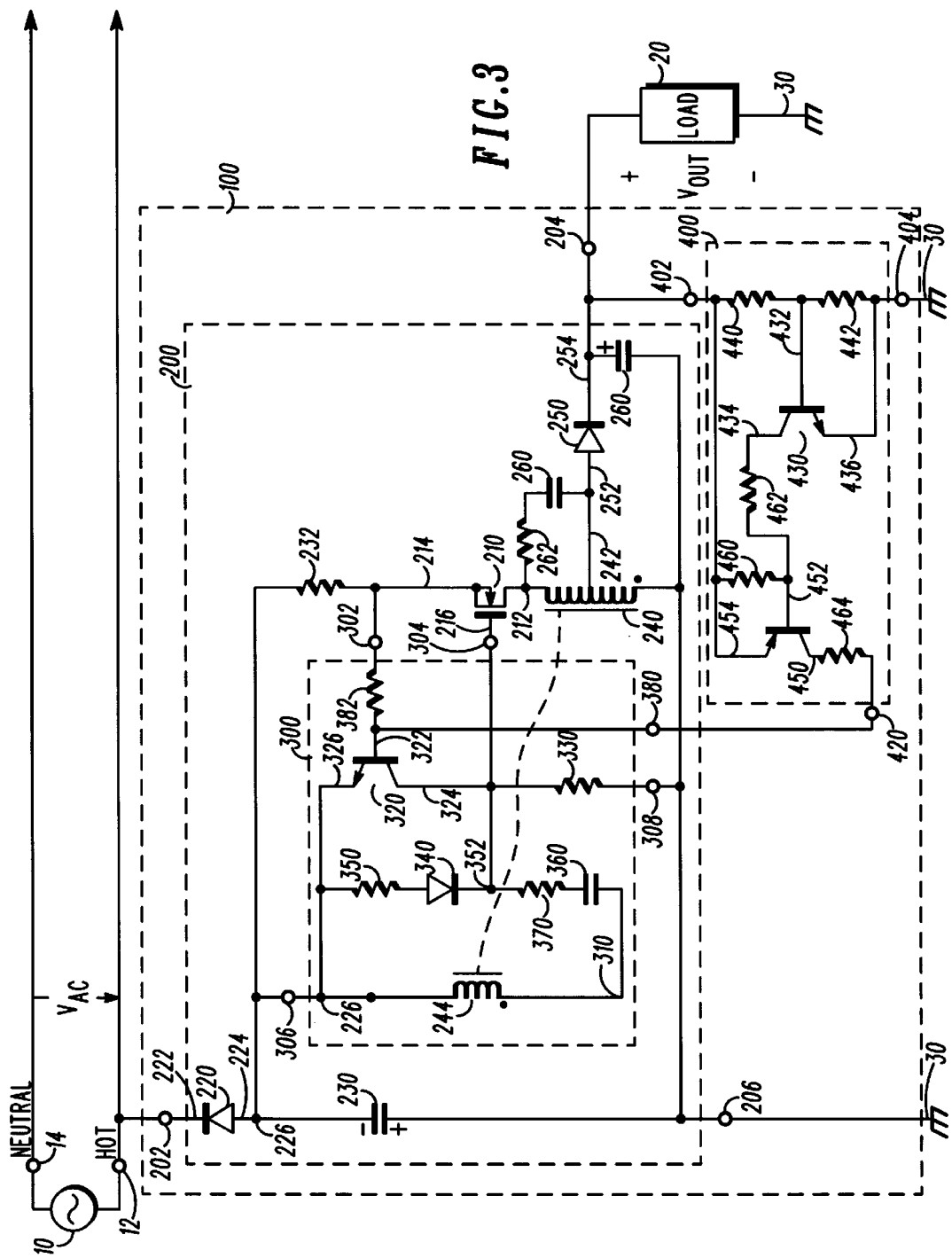
FIG. 3 is an electrical schematic of the power supply of FIG. 1, in accordance with a second preferred embodiment of the present invention.

As shown in FIG. 3, in a second preferred embodiment of power supply 100, a more extensive version of voltage regulator 400 is employed to limit the output voltage, $V_{OUT}$, by way of feedback to control circuit 300. In this embodiment, control circuit 300 further includes a regulation input 380 for receiving feedback from voltage regulator 400, and an isolation resistor 382 for electrically separating regulation input 380 and current sense input 302. Voltage regulator 400, which further includes a regulation output 420 coupled to the regulation input 380 of control circuit 300, is operable to limit $V_{OUT}$ by providing a feedback signal to control circuit 300 in response to $V_{OUT}$ attempting to exceed its desired level. That is, rather than simply clamping $V_{OUT}$ as done by the zener diode regulator described in FIG. 2, voltage regulator 400 monitors $V_{OUT}$ and correspondingly controls operation of power converter 200 so that $V_{OUT}$ is maintained at a desired level. Compared with the zener diode regulator described in FIG. 2, this regulator provides the advantages of reduced power dissipation and from a practical design standpoint, more precise control over the resulting value for $V_{OUT}$.

Referring again to FIG. 3, voltage regulator 400 preferably includes an overvoltage detect switch 430, a first divider resistor 440, a second divider resistor 442, a slave switch 450, a base resistor 460, a collector resistor 462, and an output resistor 464. Overvoltage detect switch 430, which is preferably implemented using an NPN-type BJT, has a base lead 432, a collector lead 434, and an emitter lead 436 that is coupled to ground connection 404. First divider resistor 440 is coupled between input connection 402 and the base lead 432 of overvoltage detect switch 430. Second divider resistor 442 is coupled between ground connection 404 and the base lead 432 of overvoltage detect switch 430. Slave switch 450, which is preferably implemented using a high voltage (i.e., collector-to-emitter voltage rating of at least 200 volts when used with a 120 volt RMS AC source) PNP-type BJT has a collector lead 456 and an emitter lead 454 coupled to input connection 402. Output resistor 464 is coupled between regulation output 420 and the collector lead 456 of slave switch 450.

The detailed operation of voltage regulator 400 is now explained with reference to FIG. 3 as follows. Resistors 440,442 serve as a resistive voltage divider for monitoring the output voltage, $V_{OUT}$, and are sized (i.e., in terms of their resistances) so that, when $V_{OUT}$ is at its desired value, the voltage across resistor 442 is just bellow the base-to-emitter voltage that is required to turn on transistor 430; for a small signal BJT, the base-to-emitter voltage necessary to effect turn on of the transistor is typically around 0.6 volts. Thus, if and when $V_{OUT}$ attempts to exceed its desired value, the voltage across resistor 442 will become large enough to turn on transistor 430. With transistor 430 on, a positive current then flows out of the base lead 452 of transistor 450, thereby effecting turn on of transistor 450. Resistor 462 serves to limit the resulting current flowing out of base lead 452, and into collector lead 434, to a reasonably low value.

With slave transistor 450 on, a voltage offset is introduced at the base lead 322 of transistor 320 by way of regulation output 420 and regulation input 380. Resistor 464 serves as a current-limiting and biasing resistor. This voltage offset, which augments or adds to the voltage that is already provided at the base lead 322 of turn-off switch 320 via current sense input 302, causes switch 320 to turn on sooner than it would in the absence of voltage regulator 400. Correspondingly, this causes converter switch 210 to turn off somewhat prematurely. The associated reduction in the on-time of converter switch 210 causes a reduction in the output voltage of power converter 200. In this way, voltage regulator 400 limits $V_{OUT}$ by reducing the duty cycle of converter switch 210 if $V_{OUT}$ attempts to exceed its desired value.

An experimental prototype of power supply 100, configured substantially as described in FIG. 3, was built and tested. During steady-state operation, the prototype power supply drew less than than 4 millamperes of RMS ground leakage current from a 120 volt (RMS), 60 hertz AC source, and provided about 8 millamperes of RMS output current at a DC output voltage of about 5 volts.

Power supply 100 provides a number of important advantages over existing approaches for supplying power to a ground referenced load. First, because it does not require access to the neutral wire of the AC source, power supply 100 is readily installed existing AC electrical systems. Secondly, due to its "shunt" connection between the AC source and earth ground, power supply 100 provides output power that is substantially independent of load variations in the branch circuit. Furthermore, power supply 100 is capable of being implemented using a self-oscillating power converter and a voltage regulator circuit that are both cost-effective and that allow power supply 100 to satisfy existing standards for ground leakage current. The result is a leakage current power supply that is economical, reliable, and relatively easy to install.

Although the present invention has been described with reference to certain preferred embodiments, numerous modifications and variations can be made by those skilled in the art without departing from the novel spirit and scope of this invention. For example, power converter 200 may be implemented in an "isolated" version wherein the inductor further includes an auxiliary winding for providing an isolated output for a load that is not necessarily referenced to earth ground.

What is claimed is:

1. An electronic power supply for receiving power from an alternating current (AC) source and for supplying power to a load that is referenced to earth ground, the power supply comprising:

a power converter, comprising:
   an input terminal coupleable to a hot wire of the AC source to receive a ground leakage current;
   an output terminal coupleable to the load to provide an output current;
   a ground terminal coupleable to earth ground;
   a converter switch having a drain lead, a source lead, and a gate lead;
   a first rectifier having a cathode coupled to the input terminal, and an anode coupled to a first node;
   a filtering capacitor coupled between the first node and the ground terminal;
   a current sensing resistor coupled between the first node and the source lead of the converter switch;
   an inductor having a primary winding coupled between the drain lead of the power switch and the ground terminal, the primary winding including a tap connection;
   a second rectifier having an anode coupled to the tap connection of the primary winding, and a cathode coupled to the output terminal;
   an energy storage capacitor coupled between the output terminal and the ground terminal; and
   a control circuit for turning the converter switch on and off, the control circuit including a current sense input coupled to the source lead of the converter switch, a drive output coupled to the gate lead of the converter switch, a reference terminal coupled to the first node, a regulation input, and a ground connection coupled to the ground terminal;

a voltage regulator having an input connection coupled to the output terminal of the power converter, a regulation output coupled to the regulation input of the control circuit, and a ground connection coupled to earth ground, the voltage regulator being operable to control operation of the power converter so that the voltage between the output terminal and earth ground is limited to a predetermined level;

wherein the voltage regulator circuit further comprises:
   an overvoltage detect switch having a base lead, a collector lead, and an emitter lead;
   a first divider resistor coupled between the input connection and the base lead of the overvoltage detect switch;
   a second divider resistor coupled between the ground connection and the base lead of the overvoltage detect switch;
   a slave switch having a base lead, a collector lead, and an emitter lead coupled to the input connection;
   a base resistor coupled between the input connection and the base lead of the slave switch;
   a collector resistor coupled between the collector lead of the overvoltage detect switch and the base lead of the slave switch; and
   an output resistor coupled between the regulation output and the collector lead of the slave switch.

2. A leakage current power supply for receiving ground leakage current from an alternating current (AC) source and for supplying power to a load that is referenced to earth ground, the leakage current power supply comprising:

a power converter, comprising:
   an input terminal coupleable to a hot wire of the source of alternating current;
   an output terminal coupleable to the load;
   a ground terminal coupleable to earth ground;
   a converter switch having a drain leads a source lead, and a gate lead;
   a first rectifier having a cathode coupled to the input terminal and an anode coupled to a first node;
   a filtering capacitor coupled between the first node and the ground terminal;
   a current sensing resistor coupled between the first node and the source lead of the converter switch;
   an inductor, comprising:
     a primary winding coupled between the ground terminal and the drain lead of the converter switch, the primary winding including a tap connection; and
     a secondary winding;
   a control circuit, comprising:
     a current sense input coupled to the source lead of the converter switch;
     a drive output coupled to the gate lead of the converter switch;
     a reference terminal coupled to the first node;
     a regulation input;
     a ground connection coupled to the ground terminal;
     a turn-off switch having a base lead coupled to the regulation input, an emitter lead coupled to the reference terminal, and a collector lead coupled to the drive output;
     an isolation resistor coupled between the current sense input and the base lead of the turn-off switch;
     a startup resistor coupled between the ground terminal and the drive output;
     the secondary winding of the inductor being coupled between the reference terminal and a second node;
     a first series combination of a level-shifting rectifier and a first current-limiting resistor, the first series combination being coupled between the reference terminal and a third node, wherein the third node is coupled to the drive output and the level-shifting rectifier is oriented to allow a positive current to flow from the reference terminal to the third node; and
     a second series combination of a level-shifting capacitor and a second current-limiting resistor, the second series combination being coupled between the second node and the third node;
   a second rectifier having an anode coupled to the tap connection of the primary winding, and a cathode coupled to the output terminal; and
   an energy storage capacitor coupled between the output terminal and the ground terminal; and a voltage regulator, comprising:
   an input connection coupled to the output terminal of the power converter;
   a regulation output coupled to the regulation input of the control circuit;
   a ground connection coupled to earth ground;

an overvoltage detect switch having a base lead, a collector lead, and an emitter lead;

a first divider resistor coupled between the input connection and the base lead of the overvoltage detect switch;

a second divider resistor coupled between the base lead of the overvoltage detect switch and the ground connection;

a slave switch having a base lead, a collector lead, and an emitter lead coupled to the input connection;

a base resistor coupled between the input connection and the base lead of the slave switch;

a collector resistor coupled between the collector lead of the overvoltage detect switch and the base lead of the slave switch; and an output resistor coupled between the regulation output and the collector lead of the slave switch.

3. An electronic power supply for receiving power from an alternating current (AC) source and for supplying power to a load that is referenced to earth ground, the power supply comprising:

a power converter having an input-terminal coupleable to a hot wire of the AC source, an output terminal coupleable to the load, and a ground terminal coupleable to earth ground the power converter being operable to receive a ground leakage current at the input terminal and to provide an output voltage between the output terminal and earth ground, the power converter being further operable, for an appropriately sized load, to supply an output current having a steady-state average value that is greater than that of the ground leakage current;

a voltage regulator having an input connection coupled to the output terminal of the power converter and a ground connection coupleable to earth ground, the voltage regulator being operable to limit the output voltage of the power converter to a predetermined level;

wherein the power converter further comprises:

a converter switch having a drain lead, a source lead, and a gate lead;

a first rectifier having a cathode coupled to the input terminal, and an anode coupled to a first node;

a filtering capacitor coupled between the first node and the ground terminal;

a current sensing resistor coupled between the first node and the source lead of the converter switch;

an inductor having a primary winding coupled between the drain lead of the power switch and the ground terminal, the primary winding including a tap connection;

a second rectifier having an anode coupled to the tap connection of the primary winding, and a cathode coupled to the output terminal;

an energy storage capacitor coupled between the output terminal and the ground terminal; and a control circuit for turning the converter switch on and off, the control circuit including a current sense input coupled to the source lead of the converter switch, a drive output coupled to the gate lead of the converter switch, a reference terminal coupled to the first node, and a ground connection coupled to the ground terminal;

wherein the inductor further includes a secondary winding that is part of the control circuit and that is coupled between the reference terminal and a second node; and wherein the control circuit further comprises:

a turn-off switch having a base lead coupled to the current sense input, an emitter lead coupled to the reference terminal, and a collector lead coupled to the drive output;

a startup resistor coupled between the ground connection and the drive output;

a first series combination of a level-shifting rectifier and a first current-limiting resistor, the first series combination being coupled between the reference terminal and a third node, wherein the third node is coupled to the drive output and the level-shifting rectifier is oriented to allow a positive current to flow from the reference terminal to the third node; and a second series combination of a level-shifting capacitor and a second current-limiting resistor, the second series combination being coupled between the second node and the third node.

4. The electronic power supply of claim 3, wherein:

the control circuit further includes: (i) a regulation input coupled to the base lead of the turn-off switch; and (ii) an isolation resistor interposed between the current sense input and the base lead of the turn-off switch; and the voltage regulator further comprises a regulation output coupled to the regulation input of the control circuit, the voltage regulator being operable to limit the output voltage by providing a feedback signal to the control circuit in response to the output voltage attempting to exceed the predetermined level.

5. The electronic power supply of claim 4, wherein the voltage regulator circuit further comprises:

an overvoltage detect switch having a base lead, a collector lead, and an emitter lead, wherein the emitter lead is coupled to the ground connection;

a first divider resistor coupled between the input connection and the base lead of the overvoltage detect switch;

a second divider resistor coupled between ground connection and the base lead of the overvoltage detect switch;

a slave switch having a base lead a collector lead, and an emitter lead coupled to the input connection;

a base resistor coupled between the input connection and the base lead of the slave switch;

a collector resistor coupled between the collector lead of the overvoltage detect switch and the base lead of the slave switch; and an output resistor coupled between the regulation output and the collector lead of the slave switch.

6. The electronic power supply of claim 5, wherein the overvoltage detect switch is an NPN-type bipolar junction transistor, and the slave switch is a PNP-type bipolar junction transistor.

7. The electronic power supply of claim 3, wherein the voltage regulator further comprises a zener diode having a cathode coupled to the input connection and an anode coupled to the ground connection.

8. The electronic power supply of claim 3, wherein the power converter further comprises a snubber circuit coupled between the drain lead of the converter switch and the tap of the primary winding of the inductor, the snubber circuit comprising a series combination of a snubber capacitor and a snubber resistor.

9. The electronic power supply of claim 3 wherein the converter switch is an N-channel field-effect transistor, and the turn-off switch is an NPN-type bipolar junction transistor.

* * * * *